(12) United States Patent
Winkelhake et al.

(10) Patent No.: US 10,836,670 B2
(45) Date of Patent: Nov. 17, 2020

(54) ARRANGEMENT FOR REALIZING THE VACUUM OPERATION IN THE MOULDING PROCESS OF A GLASS MOULDING MACHINE

(71) Applicant: Heye International GmbH, Obernkirchen (DE)

(72) Inventors: Dirk Winkelhake, Nienstädt (DE); Thomas Hartmann, Bückeburg (DE); Ralf Schöttelndreier, Nienstädt (DE)

(73) Assignee: Heye International GmbH, Obernkirchen (DE)

( * ) Notice: Subject to any disclaimer, the term of this patent is extended or adjusted under 35 U.S.C. 154(b) by 85 days.

(21) Appl. No.: 15/736,965

(22) PCT Filed: Jun. 1, 2016

(86) PCT No.: PCT/EP2016/000894
§ 371 (c)(1),
(2) Date: Dec. 15, 2017

(87) PCT Pub. No.: WO2016/202429
PCT Pub. Date: Dec. 22, 2016

(65) Prior Publication Data
US 2018/0170787 A1  Jun. 21, 2018

(30) Foreign Application Priority Data
Jun. 17, 2015  (DE) .......... 10 2015 007 695

(51) Int. Cl.
*C03B 9/36* (2006.01)
*C03B 9/41* (2006.01)
*C03B 9/38* (2006.01)

(52) U.S. Cl.
CPC .............. *C03B 9/3636* (2013.01); *C03B 9/36* (2013.01); *C03B 9/3618* (2013.01);
(Continued)

(58) Field of Classification Search
CPC .. G05B 2219/2635; G05B 2219/45009; C03B 9/36; C03B 9/3627; C03B 9/3636;
(Continued)

(56) References Cited

U.S. PATENT DOCUMENTS 1,946,411 A * 2/1934 Roirant ................... C03B 9/347
249/141
2,069,541 A * 2/1937 Soubier ................... C03B 9/145
65/224
(Continued)

FOREIGN PATENT DOCUMENTS

DE  3135152 A1  3/1983
DE  3435152 A1  3/1986
(Continued)

OTHER PUBLICATIONS

International Preliminary Report on Patentability dated Dec. 19, 2017 issued in related PCT/EP2016/000894.

*Primary Examiner* — Jason L Lazorcik
(74) *Attorney, Agent, or Firm* — Fox Rothschild LLP

(57) ABSTRACT

For the monitoring of the application of a vacuum to the finished moulds (1, 2) of a glass moulding machine, in particular of an I. S. machine, an arrangement is proposed which is composed of a vacuum sensor (13, 14), which vacuum sensor is arranged in a vacuum line (5, 6) which charges the finished mould (1, 2) and which vacuum sensor is designed for pressure measurement and detects a pressure value, which pressure value is transmitted by way of a microcontroller (15, 16) of an I. S. machine controller (22) by way of which, in a manner dependent on the measured value, a hollow glass article can be identified as being defective and rejected. The arrangement permits automated monitoring of the vacuum operation and a lessening of the burden on operating personnel, and serves for the automated assurance of product quality.

22 Claims, 1 Drawing Sheet

(52) U.S. Cl.
CPC .......... *C03B 9/3663* (2013.01); *C03B 9/3816* (2013.01); *C03B 9/41* (2013.01); *G05B 2219/2635* (2013.01); *G05B 2219/41301* (2013.01); *G05B 2219/45009* (2013.01)

(58) Field of Classification Search
CPC ... C03B 9/3663; C03B 9/3672; C03B 9/3681; C03B 9/369; C03B 9/40; C03B 9/403; C03B 9/406; C03B 9/41
See application file for complete search history.

(56) References Cited

U.S. PATENT DOCUMENTS

| | | | | |
|---|---|---|---|---|
| 2,467,000 A * | 4/1949 | Samuelson | ........... | C03B 9/3627 65/263 |
| 3,252,782 A * | 5/1966 | Moreau | ........... | C03B 9/32 65/263 |
| 4,034,036 A * | 7/1977 | Farrell | ........... | B29C 33/3814 264/526 |
| 4,120,924 A * | 10/1978 | Rainville | ........... | B29C 49/58 264/45.5 |
| 4,152,134 A * | 5/1979 | Dowling | ........... | C03B 9/41 65/163 |
| 4,276,073 A * | 6/1981 | Northup | ........... | C03B 9/165 65/263 |
| 4,293,004 A * | 10/1981 | Lowe | ........... | C03B 9/406 137/596.16 |
| 4,362,544 A * | 12/1982 | Mallory | ........... | C03B 9/16 65/161 |
| RE31,529 E * | 3/1984 | Lowe | ........... | C03B 9/406 137/596.16 |
| 4,490,800 A * | 12/1984 | Powers | ........... | C03B 9/41 702/140 |
| 4,579,576 A * | 4/1986 | Jones | ........... | C03B 9/3891 62/265 |
| 4,623,375 A | 11/1986 | Cardenas-Franco et al. | | |
| 4,657,573 A * | 4/1987 | Jones | ........... | C03B 9/3875 65/265 |
| 4,783,212 A * | 11/1988 | Loffler | ........... | C03B 9/3866 65/265 |
| 5,580,366 A | 12/1996 | Farkas et al. | | |
| 5,649,989 A * | 7/1997 | Jones | ........... | C03B 9/16 264/523 |
| 5,833,731 A * | 11/1998 | Mungovan | ........... | C03B 9/16 65/227 |
| 6,202,446 B1 * | 3/2001 | Gottlieb | ........... | C03B 9/165 65/229 |
| 6,401,491 B1 | 6/2002 | Wacke | | |
| 6,457,331 B1 * | 10/2002 | Kammonen | ........... | C03B 9/3627 65/263 |
| 7,054,710 B2 * | 5/2006 | Hartmann | ........... | C03B 9/41 65/160 |
| 7,698,907 B1 * | 4/2010 | Hayes | ........... | C03B 9/3875 65/361 |
| 7,958,749 B2 * | 6/2011 | Kirkman | ........... | C03B 9/3866 65/261 |
| 2002/0184918 A1 * | 12/2002 | Simon | ........... | C03B 9/41 65/29.1 |
| 2002/0189287 A1 * | 12/2002 | Simon | ........... | C03B 9/41 65/29.1 |
| 2002/0189288 A1 * | 12/2002 | Simon | ........... | C03B 9/41 65/29.1 |
| 2002/0189292 A1 * | 12/2002 | Simon | ........... | C03B 9/41 65/158 |
| 2002/0189293 A1 * | 12/2002 | Simon | ........... | C03B 9/41 65/158 |
| 2002/0189294 A1 * | 12/2002 | Simon | ........... | C03B 9/41 65/158 |
| 2002/0194871 A1 * | 12/2002 | Simon | ........... | C03B 9/41 65/29.11 |
| 2002/0194874 A1 * | 12/2002 | Simon | ........... | C03B 9/41 65/158 |
| 2002/0194875 A1 * | 12/2002 | Simon | ........... | C03B 9/41 65/158 |
| 2003/0101752 A1 * | 6/2003 | Anheyer | ........... | C03B 9/3681 65/161 |
| 2003/0101753 A1 * | 6/2003 | Fenton | ........... | C03B 9/165 65/161 |
| 2003/0101754 A1 * | 6/2003 | Hyre | ........... | C03B 9/3681 65/161 |
| 2003/0101756 A1 * | 6/2003 | Diehm | ........... | C03B 9/3681 65/163 |
| 2003/0101762 A1 * | 6/2003 | Hyre | ........... | C03B 9/3681 65/260 |
| 2003/0101766 A1 * | 6/2003 | Mungovan | ........... | C03B 9/3681 65/261 |
| 2003/0101767 A1 * | 6/2003 | Hyre | ........... | C03B 9/3681 65/261 |
| 2003/0101768 A1 * | 6/2003 | Hyre | ........... | C03B 9/3681 65/261 |
| 2003/0167799 A1 * | 9/2003 | Tijerina-Ramos | ........... | C03B 9/342 65/68 |
| 2007/0214838 A1 * | 9/2007 | Fenton | ........... | B29C 49/58 264/45.5 |
| 2008/0145467 A1 * | 6/2008 | Anheyer | ........... | C03B 9/3618 425/149 |
| 2012/0174628 A1 * | 7/2012 | Simon | ........... | G05B 19/042 65/29.19 |
| 2015/0013387 A1 * | 1/2015 | Borcherding | ........... | C03B 9/3816 65/29.11 |
| 2018/0105447 A1 * | 4/2018 | Graff | ........... | C03B 9/36 |

FOREIGN PATENT DOCUMENTS

| | | |
|---|---|---|
| DE | 20301676 U1 | 3/2004 |
| DE | 60108548 T2 | 7/2005 |
| EP | 0165012 A1 | 12/1985 |
| EP | 1466871 A2 | 10/2004 |
| GB | 2297548 A | 8/1996 |
| JP | 2002047015 A * | 2/2002 .......... C03B 9/3627 |

* cited by examiner

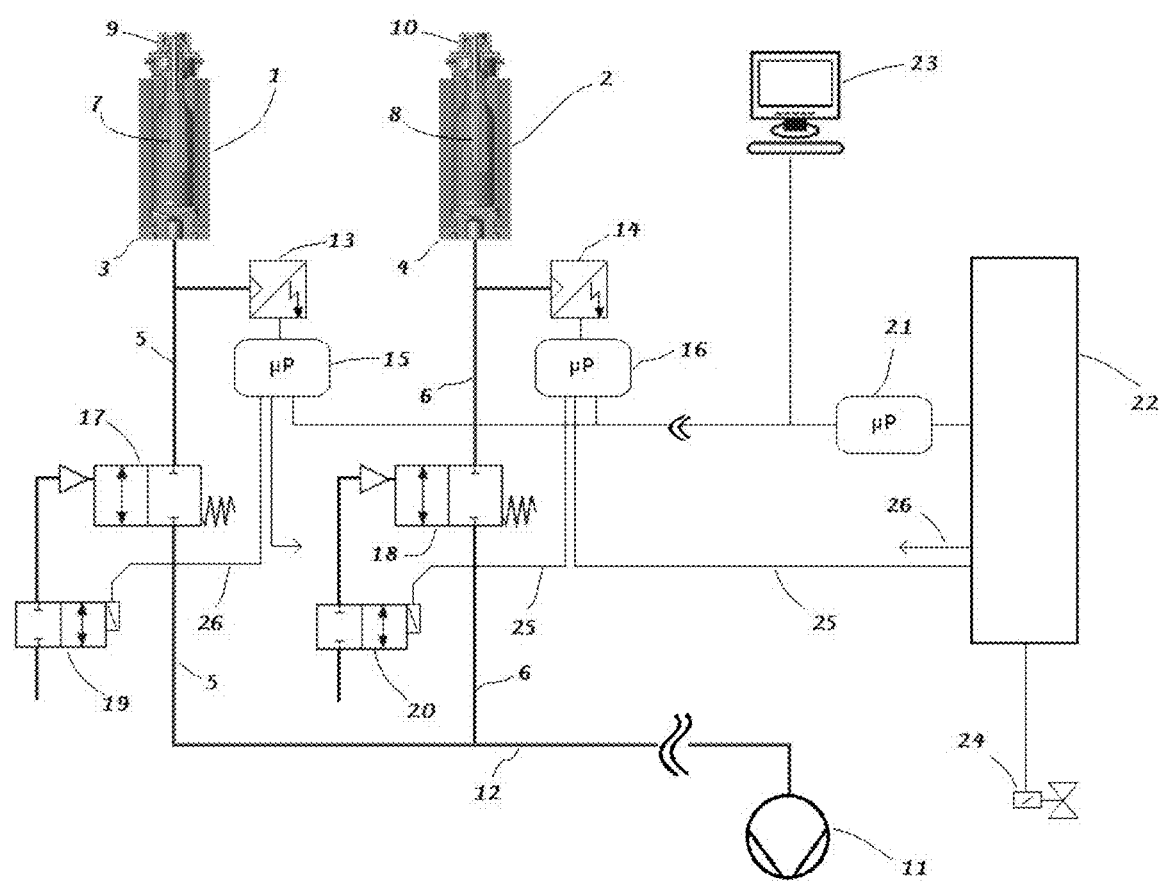

ARRANGEMENT FOR REALIZING THE VACUUM OPERATION IN THE MOULDING PROCESS OF A GLASS MOULDING MACHINE

The invention relates to an arrangement for monitoring the vaccum operation for at least one finished form of an I.S. machine to improve product quality.

The production of hollow glass articles in a glass-forming machine, starting from a glass melt, takes place via a shaping process, which is processed on a previously formed glass gob by means of a preform serving for the formation of a blank and of a finished form serving to form a finished product. The article is then transferred via a dead plate to a conveyor belt which is introduced into a lehr.

The process is characterized by several stations, the respective operating parameters of which must be adjustable with regard to a reproducible production result of constant quality and must be monitored. This applies to all parameters influencing the shaping process, in particular the vacuum operation, which is used in the blow-out of the hollow glass article in a finished form, and the correct operating mode of which has hitherto been checked only in accordance with the personal experience of the respective operating personnel. However, this type of control is always associated with the loss of a hollow glass article.

It is therefore problematic that the flawless function of the vacuum operation during final blow is not immediately detectable, but only detectable on the basis of faulty hollow glass articles. A further problem is the final blow without glass, which frequently occurs with the start-up of a machine, which has a detrimental effect on the vacuum operation in its entirety and can lead to faulty products at neighboring stations.

The use of vacuum to assist the introduction of a molten liquid glass gob into a preform is known per se from DE 34 35 152 A1.

It is the object of the present invention to design an arrangement of the type initially described in a simple manner with a view to achieving an improved and uniformly reproducible product quality. This object is achieved in such an arrangement by the features of the present invention.

According to the invention, a pressure measurement, which is designed to determine the current vacuum in the finished form, and a pressure measuring device equipped for evaluation or conversion of the pressure measurement values obtained with an I.S. machine control and a microcontroller connected to a valve in the vacuum line which is applied to a finished form. The use of a microcontroller at this point—it can also be a microprocessor—a single-chip computer system thus opens numerous processing and evaluation options for the detected pressure measurement values defined by the programming. This relates to the fact that the connection to the I.S. machine control also acts upon the process flow of the glass-forming. Advantageously, the vacuum operation of each of the plurality of stations of the glass-forming machine, in particular of each finished form, can be individually monitored, so that a comprehensive monitoring of defined states of the vacuum operation can be illustrated in accordance with user-definable criteria, and, in fact, in an automated process. It is particularly advantageous in this case that a loss of hollow glass articles is avoided within the scope of the monitoring of the vacuum operation which has been arranged in this way.

In principle, a microcontroller can be assigned to each finished form for evaluating the detected pressure measurement values. The features of another embodiment of the invention are directed in this respect to a simplification of the arrangement as at least a primary evaluation of the pressure measurement values, which are determined according to the invention and describe the actual vacuum state of all finished forms, is combined in a microcontroller or microprocessor.

The microcontroller according to the features of yet another embodiment of the invention forms the link for an ejector via the I.S. machine control. A hollow glass article identified as faulty due to vacuum monitoring is thus automatically discarded. The functions arranged in this microcontroller can, however, likewise be processed in the microcontrollers assigned to the vacuum sensors.

Additional features of the invention are directed to the further evaluation of the determined pressure measurement values of the finished forms. A computer is provided for this purpose, which is set up in particular for evaluating the temporal progression of the pressure measurement values and thus enables the earliest possible recognition of trends. Measures for preventive maintenance can be derived from this—an emerging malfunction can thus be recognized in time and, if necessary, remedied without the need for extensive production failures as a result of longer required stoppage times.

According to the features of another embodiment of the invention, visual and/or acoustic information about a detected or an emerging fault can be conveyed to the operating personnel by means of the time profile of the pressure measurement values via the computer. In this way, information about the nature of the detected fault can be generated at the same time.

According to the features of additional embodiments, the microcontroller assigned to the vacuum sensors is equipped for recognizing an overshooting and/or undershooting of target values of the pressure or the vacuum, and furthermore, in the presence of this situation, which indicates the presence of a faulty hollow glass article, at least gives the operating personnel a visual or acoustic type of indication. The said microcontroller is also arranged to interrupt the vacuum application of the finished forms as part of the glass-forming process.

According to the features of yet another embodiment, the pressure or vacuum measurement of the finished form can be used to eject a hollow glass article identified as defective by means of this measurement, with the assistance of the I.S. machine control.

It can be seen from the above implementations that with the use of the subject matter of the invention in a glass-forming machine, in particular an I.S. machine, the operating personnel can experience considerable relief and there is also a contribution to a continuous and reproducible product quality.

Numerous variations of the subject matter of the invention are possible, wherein in particular the functions which are processed via microcontrollers can likewise be handled via microprocessors or a computer.

The underlying structure of the arrangement according to the invention for monitoring a vacuum operation is not limited to an application in finished forms and can be used in all cases where a vacuum condition is to be displayed and monitored locally.

BRIEF DESCRIPTION OF THE DRAWING

The invention is explained in more detail below with reference to the exemplary embodiment shown in the drawing FIG. 1.

DETAILED DESCRIPTION

FIG. 1 shows by way of example an I.S. machine with 1, 2 two finished forms, on which vacuum lines are connected to their respective floor regions 3, 4. The finished forms form part of an I.S. machine, and are shown at the beginning of the final blowing, wherein a parison 7, 8 is located in each of them and is blown out by means of a blow head 9, 10. In this case, the volume of the finished form 1, 2, which is not filled by the respective parison 7, 8, is subjected to a vacuum.

Numeral 11 denotes a vacuum pump, which is connected to the vacuum lines 5, 6 of the finished forms 1, 2 via a collecting line 12.

Vacuum sensors, indicated by 13, 14, are determined and equipped for measuring the pressure in the vacuum lines 5, 6 and thus the finished forms 1, 2. They respectively generate an electrical signal representing the measured pressure, which is transmitted to a microcontroller 15, 16.

Valves, indicated by 17, 18, are arranged in the course of the vacuum lines 5, 6, which valves are respectively switchable between an open and a closed position via pilot valves 19, 20. The valves 17, 18 are configured as pressure-actuated valves, a position of which is secured by spring force. The pilot valves 19, 20 are configured as electrically actuatable valves and connected to the microcontrollers 15, 16 via signal lines 25, 26.

The microcontrollers 15, 16 fulfill several tasks. They are used in the context of the glass-forming process by controlling the respective pilot valves 19, 20 to apply vacuum to the finished forms 1, 2 or to separate them from the vacuum source, here the vacuum pump. On the output side, the microcontrollers 15, 16 are further connected to a computer 23 and via an additional microcontroller 21, which fulfills a coupling function, to an I.S. machine control 22. All control functions of the glass-forming process of the plurality of stations of the glass-forming machine are combined in the machine control 22.

A target value or a limit value of the pressure, in this case of the vacuum, can be assigned to the pressure measurement values, and the respectively shaped hollow glass article is identified as faulty and ejected as defective with its overshooting or undershooting, which signals a vacuum that is too low. In this case, a signal is issued via the microcontroller 21 to the I.S. machine control 22, via which a valve 24, which controls a (not shown) ejector, is actuated. In this case, an identification of the hollow glass article determined as defective is assumed. However, this is not to be dealt with at this point.

The pressure measurement value determined via the vacuum sensors also reaches the computer 23 via the microcontrollers 15, 16 and is here subjected to further processing, in particular in the time sequence. By way of example, in this case, a trend analysis can be arranged, namely, before an overshooting or undershooting of limit values of the measured pressure is present, which signals changes of this measured value at an early stage, which indicate a first emerging fault. In this way, the operating personnel can be given an indication to intervene in the operational sequence of the glass shaping as part of a preventive maintenance.

Corresponding to the change in the measured pressure value, acoustic or visual information can also be conveyed to the respective operating and maintenance personnel.

LIST OF REFERENCE NUMBERS

1. Finished form
2. Finished form
3. Floor region
4. Floor region
5. Vacuum line
6. Vacuum line
7. Parison
8. Parison
9. Blow head
10. Blow head
11. Vacuum pump
12. Collecting line
13. Vacuum sensor
14. Vacuum sensor
15. Microcontroller
16. Microcontroller
17. Valve
18. Valve
19. Pilot valve
20. Pilot valve
21. Microcontroller
22. I.S. machine control
23. Computer
24. Valve
25. Signal line
26. Signal line

The invention claimed is:

1. An I.S. machine, comprising:
at least one finished form;
a vacuum pump;
at least one vacuum line connected to the vacuum pump and the finished form and configured to convey a vacuum from the vacuum pump to the finished form;
at least one valve in fluid communication with the vacuum pump and the finished form and operable to vary the vacuum conveyed from the vacuum pump to the finished form;
at least one vacuum sensor operable to measure a vacuum level within the finished form;
one or more computing devices communicatively coupled to the vacuum sensor and configured to control operation of the valve; wherein the one or more computing devices are configured to monitor the vacuum level within the finished form, and to initiate a corrective action when the vacuum level does not satisfy one or more predetermined criterion;
wherein the one or more computing devices comprises a microcontroller; and an I.S. machine controller communicatively coupled to the microcontroller; and
wherein the I.S. machine controller is configured to, on the basis of the detected vacuum measurement values, eject a hollow glass article recognized as faulty.

2. The I.S. machine according to claim 1, wherein: the at least one finished form comprises a first and a second finished form; the at least one vacuum line comprises a first vacuum line connected to the vacuum pump and the first finished form, and a second vacuum line connected to the vacuum pump and the second finished form; the at least one vacuum sensor comprises a first vacuum sensor operable to measure a vacuum level within the first finished form, and a second vacuum sensor operable to measure a vacuum level within the second finished form; and the first and second vacuum sensors are connected to the microcontroller.

3. The I.S. machine according to claim 1, wherein the microcontroller is a first microcontroller and is connected to the I.S. machine controller via a second microcontroller fulfilling a coupling function.

4. The I.S. machine according to claim 1, wherein the one or more computing devices further comprises a computer which is connected to the microcontroller and is configured to evaluate the vacuum measurement values determined via the vacuum sensor.

5. The I.S. machine according to claim 4, wherein the computer is configured to, on the basis of the temporal course of the detected vacuum measurement values, recognize, and generate at least a visual representation of fault conditions of the vacuum operation, said fault conditions being defined by one or more users of the system.

6. The I.S. machine according to claim 4, wherein the microcontroller is configured to, on the basis of the detected vacuum measurement values, signal undershooting and/or overshooting of target values of the vacuum level.

7. The I.S. machine according to claim 4, wherein the microcontroller is configured to, via the valve, interrupt the application of vacuum to the finished form.

8. The I.S. machine according to claim 1, wherein the microcontroller is configured to, on the basis of the detected vacuum measurement values, signal undershooting and/or overshooting of target values of the vacuum level.

9. The I.S. machine according to claim 1, wherein the microcontroller is configured to, via the valve, interrupt the application of vacuum to the finished form.

10. The I.S. machine of claim 1, wherein the one or more predetermined criteria is a target value or a limiting value for the vacuum level.

11. An I.S. machine, comprising:
at least one finished form;
a vacuum pump;
at least one vacuum line connected to the vacuum pump and the finished form and configured to convey a vacuum from the vacuum pump to the finished form;
at least one valve in fluid communication with the vacuum pump and the finished form and operable to vary the vacuum conveyed from the vacuum pump to the finished form;
at least one vacuum sensor operable to measure a vacuum level within the finished form;
one or more computing devices communicatively coupled to the vacuum sensor and configured to control operation of the valve; wherein the one or more computing devices are configured to monitor the vacuum level within the finished form, and to initiate a corrective action when the vacuum level does not satisfy one or more predetermined criterion;
wherein the one or more computing devices comprises a microcontroller; and an I.S. machine controller communicatively coupled to the microcontroller;
wherein: the at least one finished form comprises a first and a second finished form; the at least one vacuum line comprises a first vacuum line connected to the vacuum pump and the first finished form, and a second vacuum line connected to the vacuum pump and the second finished form; the at least one vacuum sensor comprises a first vacuum sensor operable to measure a vacuum level within the first finished form, and a second vacuum sensor operable to measure a vacuum level within the second finished form; and the first and second vacuum sensors are connected to the microcontroller; and
wherein the I.S. machine controller is configured to, on the basis of the detected vacuum measurement values, eject a hollow glass article recognized as faulty.

12. The I.S. machine according to claim 11, wherein the first and second microcontroller are connected to the I.S. machine controller via another microcontroller fulfilling a coupling function.

13. The I.S. machine according to claim 11, wherein the one or more computing devices further comprises a computer which is connected to the first and second microcontrollers and is configured to evaluate the vacuum measurement values determined via the first and second vacuum sensors.

14. The arrangement according to claim 13, wherein the computer is configured to, on the basis of the temporal course of the detected vacuum measurement values, recognize, and generate at least a visual representation of fault conditions of the vacuum operation, said fault conditions being defined by one or more users of the system.

15. The I.S. machine according to claim 11, wherein the microcontroller is configured to, on the basis of the detected vacuum measurement values, signal undershooting and/or overshooting of target values of the vacuum level.

16. The I.S. machine according to claim 11, wherein the microcontroller is configured to, via the first and second valves, interrupt the application of vacuum to the first and second finished forms.

17. An I.S. machine, comprising:
at least one finished form;
a vacuum pump;
at least one vacuum line connected to the vacuum pump and the finished form and configured to convey a vacuum from the vacuum pump to the finished form;
at least one valve in fluid communication with the vacuum pump and the finished form and operable to vary the vacuum conveyed from the vacuum pump to the finished form;
at least one vacuum sensor operable to measure a vacuum level within the finished form;
one or more computing devices communicatively coupled to the vacuum sensor and configured to control operation of the valve; wherein the one or more computing devices are configured to monitor the vacuum level within the finished form, and to initiate a corrective action when the vacuum level does not satisfy one or more predetermined criterion;
wherein the one or more computing devices comprises a microcontroller; and an I.S. machine controller communicatively coupled to the microcontroller;
wherein the microcontroller is a first microcontroller and is connected to the I.S. machine controller via a second microcontroller fulfilling a coupling function; and
wherein the I.S. machine controller is configured to, on the basis of the detected vacuum measurement values, eject a hollow glass article recognized as faulty.

18. The I.S. machine according to claim 17, wherein the one or more computing devices further comprises a computer which is connected to the first microcontroller and is configured to evaluate the vacuum measurement values determined via the vacuum sensor.

19. The I.S. machine according to claim 17, wherein the first microcontroller is configured to, on the basis of the detected vacuum measurement values, signal undershooting and/or overshooting of target values of the vacuum.

20. The I.S. machine according to claim 17, wherein the first microcontroller is configured to, via the valve, interrupt the application of vacuum to the finished form.

21. An I.S. machine, comprising:
at least one finished form;
a vacuum pump;
at least one vacuum line connected to the vacuum pump and the finished form and configured to convey a vacuum from the vacuum pump to the finished form;

at least one valve in fluid communication with the vacuum pump and the finished form and operable to vary the vacuum conveyed from the vacuum pump to the finished form;

at least one vacuum sensor operable to measure a vacuum level within the finished form;

one or more computing devices communicatively coupled to the vacuum sensor and configured to control operation of the valve; wherein the one or more computing devices are configured to monitor the vacuum level within the finished form, and to initiate a corrective action when the vacuum level does not satisfy one or more predetermined criterion;

wherein the one or more predetermined criteria is a target value or a limiting value for the vacuum level; and wherein the corrective action includes causing a hollow glass article located in the finished form to be ejected from the I.S. machine.

22. The I.S. machine of claim 21, wherein the one or more computing devices comprises a microcontroller; and an I.S. machine controller communicatively coupled to the microcontroller.

\* \* \* \* \*